United States Patent
Austin

(10) Patent No.: US 6,279,939 B1
(45) Date of Patent: Aug. 28, 2001

(54) TRAILER SAFETY CHAIN ASSEMBLY

(76) Inventor: Douglas R. Austin, 21 Bank St., Wallace, ID (US) 83873

( * ) Notice: Subject to any disclaimer, the term of this patent is extended or adjusted under 35 U.S.C. 154(b) by 0 days.

(21) Appl. No.: 09/649,138

(22) Filed: Aug. 28, 2000

(51) Int. Cl.$^7$ .................................. B60D 1/18; B60D 1/28
(52) U.S. Cl. ..................... 280/457; 280/432; 280/460.1
(58) Field of Search ..................... 280/457, 432, 280/460.1, 461.1, 767, 763.1

(56) References Cited

U.S. PATENT DOCUMENTS

| | | | |
|---|---|---|---|
| 1,732,989 | 10/1929 | Scrabeck . | |
| 2,712,877 | 7/1955 | Wiley | 214/36 |
| 2,733,078 | 1/1956 | Brehm | 280/480 |
| 2,937,885 | * 5/1960 | Skow . | |
| 3,125,355 | * 3/1964 | Snuggins . | |
| 3,128,107 | 4/1964 | Miller et al. | 280/457 |
| 3,132,878 | * 5/1964 | De Puydt . | |
| 3,265,407 | 8/1966 | Paddock | 280/457 |
| 3,718,317 | 2/1973 | Hilmer | 254/186 HC |
| 3,869,148 | * 3/1975 | Iehl | 280/457 |
| 3,997,191 | * 12/1976 | Morgan | 280/763 |
| 4,467,598 | * 8/1984 | Wells | 59/78 |
| 4,946,185 | 8/1990 | Likei | 280/457 |
| 5,362,084 | 11/1994 | Edwards | 280/457 |
| 5,435,585 | 7/1995 | Chambers | 280/415.1 |
| 5,732,967 | 3/1998 | Behling | 280/457 |
| 5,918,896 | * 7/1999 | Jenkins, Jr. | 280/457 |
| 6,179,317 | * 1/2001 | Hurst et al. | 280/457 |

FOREIGN PATENT DOCUMENTS

| | | | |
|---|---|---|---|
| 1006657 | 12/1947 | (FR) | 10/1 |
| 1006668 | 5/1948 | (FR) | 10/2 |

* cited by examiner

*Primary Examiner*—Brian L. Johnson
*Assistant Examiner*—Avraham H. Lerner
(74) *Attorney, Agent, or Firm*—Richard C. Litman

(57) ABSTRACT

A trailer safety chain assembly that is used in combination with a raised ball trailer hitch trailer coupling type of trailer attachment. The trailer safety chain is made up of two sets of chained strands that are linked between a center ring. The trailer safety chain is situated between a vehicle and trailer being transported and acts as an auxiliary trailer attachment in the event of trailer attachment failure. A mounting plate is provided on the vehicle, with a set of apertures provided that accommodate a set of inverted L-shaped hooks and a raised ball trailer hitch. The trailer safety chain is able to keep the end of a trailer tongue from touching the ground and can transport the trailer even in the event of complete trailer attachment failure.

4 Claims, 3 Drawing Sheets

TRAILER SAFETY CHAIN ASSEMBLY

BACKGROUND OF THE INVENTION

1. Field of the Invention

The present invention relates to trailer hitch assemblies in general, and more specifically to a safety chain assembly.

2. Description of the Related Art

The use of safety couplings to back-up a trailer attachment is good common sense and is well-known to those schooled in the related art. These trailer attachments can be for farm implements, towing vehicles and ball hitch-and-tongue arrangements. These safety couplings also have a variety of designs and arrangements and vary in their degree of strength and effectiveness.

U.S. Pat. No. 1,447,539 issued to Fultz outlines the use of an improved coupling for tractors that will utilize a harrow or other farm implement. The improved coupling has the advantage of being simpler, less expensive and more convenient for usage then couplings known at the time of this invention. A member or chain is provided and is engaged with a pulley or kindred member anchored to the farm implement. A safety device to back-up the coupling is not defined as part of this coupling device.

U.S. Pat. No. 1,732,989 issued to Scrabeck also outlines the use of an improved coupling for tractors. The coupling utilizes wheels on the coupling device in addition to some horizontal bracing members, with yokes being extended from the bracing members. A safety device to back-up the coupling is not provided as part of this device.

U.S. Pat. No. 2,733,078 issued to Brehm outlines the use of a vehicle towing device that can be quickly and easily attached to a vehicle. This vehicle towing device utilizes a ring and chain strand design that also incorporates springs for shock absorption. The device is less bulky and easier to handle then other vehicle towing devices which were used in the related art at the time of this invention. No safety device to back-up the towing device is provided.

U.S. Pat. No. 3,128,107 issued to Miller et al. outlines the use of an auxiliary coupling for preventing a trailer vehicle from breaking away from a towing vehicle in the event the main coupling becomes inadvertently disconnected. The auxiliary coupling serves as a safety device that does not interfere with the normal operation of the main coupling. This safety device has relatively few parts and may also be easily manipulated into a locked or unlocked position.

U.S. Pat. No. 3,265,407 issued to Paddock also outlines the use of a safety chain designed for trailers utilizing a ball trailer hitch. The safety chain has a central ring that serves as a center of the device receiving each of 4 ends of a chaining arrangement that is situated underneath the main coupling that prevents the tongue of the main coupling from touching the bottom of the road being traveled on.

U.S. Pat. No. 5,435,585 issued to Chambers outlines the use of a folding ball trailer hitch with a safety chain anchor that is designed to be mounted in the bed of a pick-up truck. The safety chain anchor does not project upwardly from the hitch when the safety chain is disengaged. The safety chain anchor is relatively inexpensive to buy and to manufacture and also has a definitive upright and stowed position.

Each of these patents outline the use of either improved main couplings or improved safety couplings. The safety couplings are particularly well designed but could benefit from an improved mounting hook arrangement and auxiliary support used to accommodate the safety device. That is what is really needed, a safety coupling for a trailer that has an improved mounting hook for greater ease of assembly and auxiliary support.

None of the above inventions and patents, taken either singularly or in combination, is seen to describe the instant invention as claimed. Thus a trailer safety chain solving the aforementioned problems is desired.

SUMMARY OF THE INVENTION

The invention is a trailer safety chain that is used in combination with a raised ball trailer hitch trailer coupling type of trailer attachment. The trailer safety chain is made up of two sets of chained strands that are linked between a center ring. The trailer safety chain is situated between a vehicle and a trailer being transported and acts as an auxiliary trailer attachment in the event of trailer attachment failure. A mounting plate is provided on the vehicle, with a set of apertures provided that accommodate a set of inverted L-shaped hooks and a raised ball trailer hitch. The trailer safety chain is able to keep the end of a trailer tongue from touching the ground and can transport the trailer even in the event of complete trailer attachment failure.

Accordingly, it is a principal object of the invention to provide an auxiliary trailer safety chain that is used together with a raised ball trailer hitch trailer coupling type of trailer attachment.

It is another object of the invention to provide a set of improved attachment hooks for easier attachment of the auxiliary trailer safety chain.

It is a further object of the invention to prevent the tongue of a trailer attachment from hitting the ground in the event of trailer attachment failure.

Still another object of the invention is to provide an auxiliary trailer attachment that has the capability to transport a trailer by itself in the event of trailer attachment failure.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
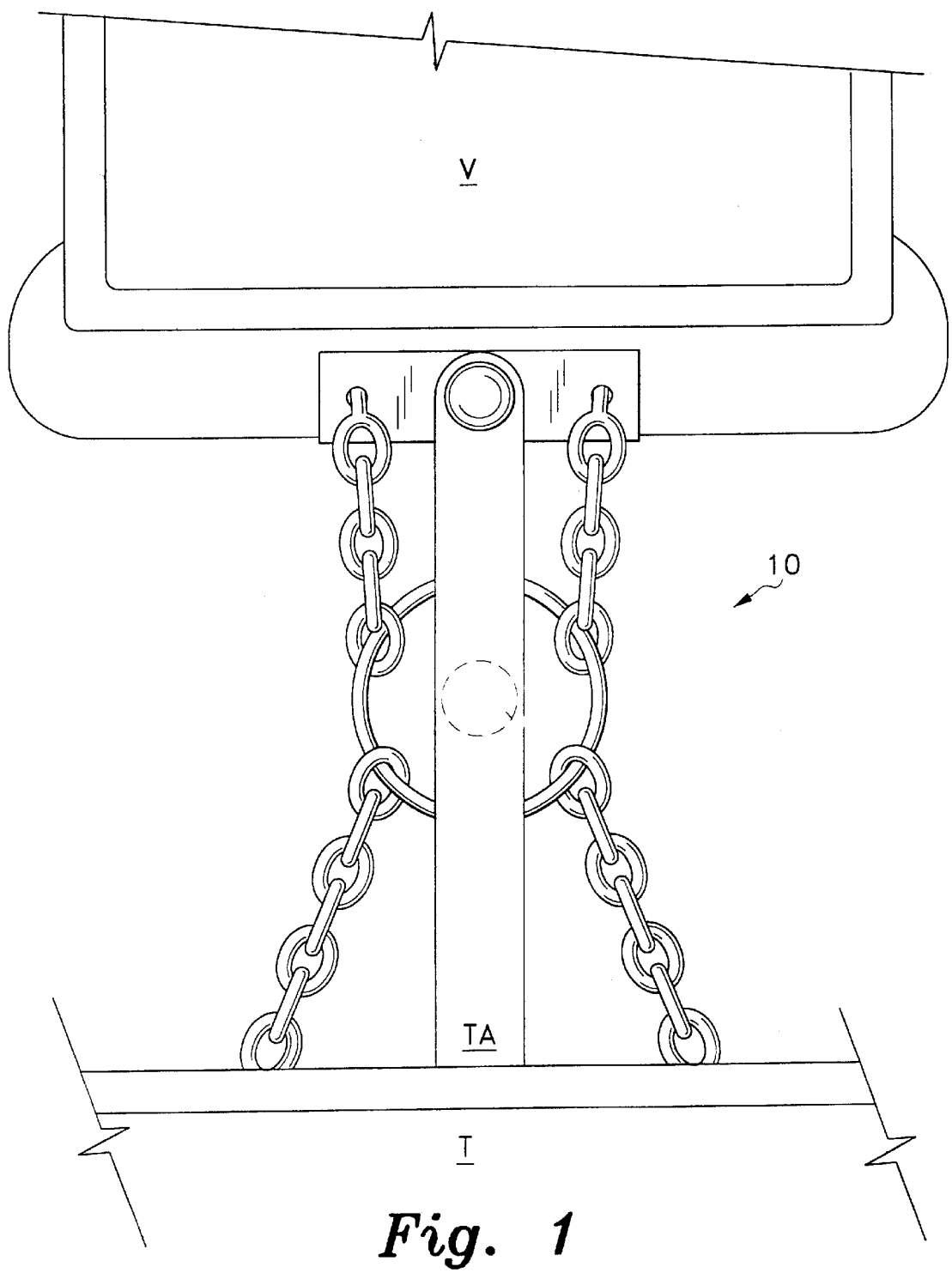
FIG. 1 is an environmental, perspective view of a trailer safety chain according to the present invention.
Figure 2:
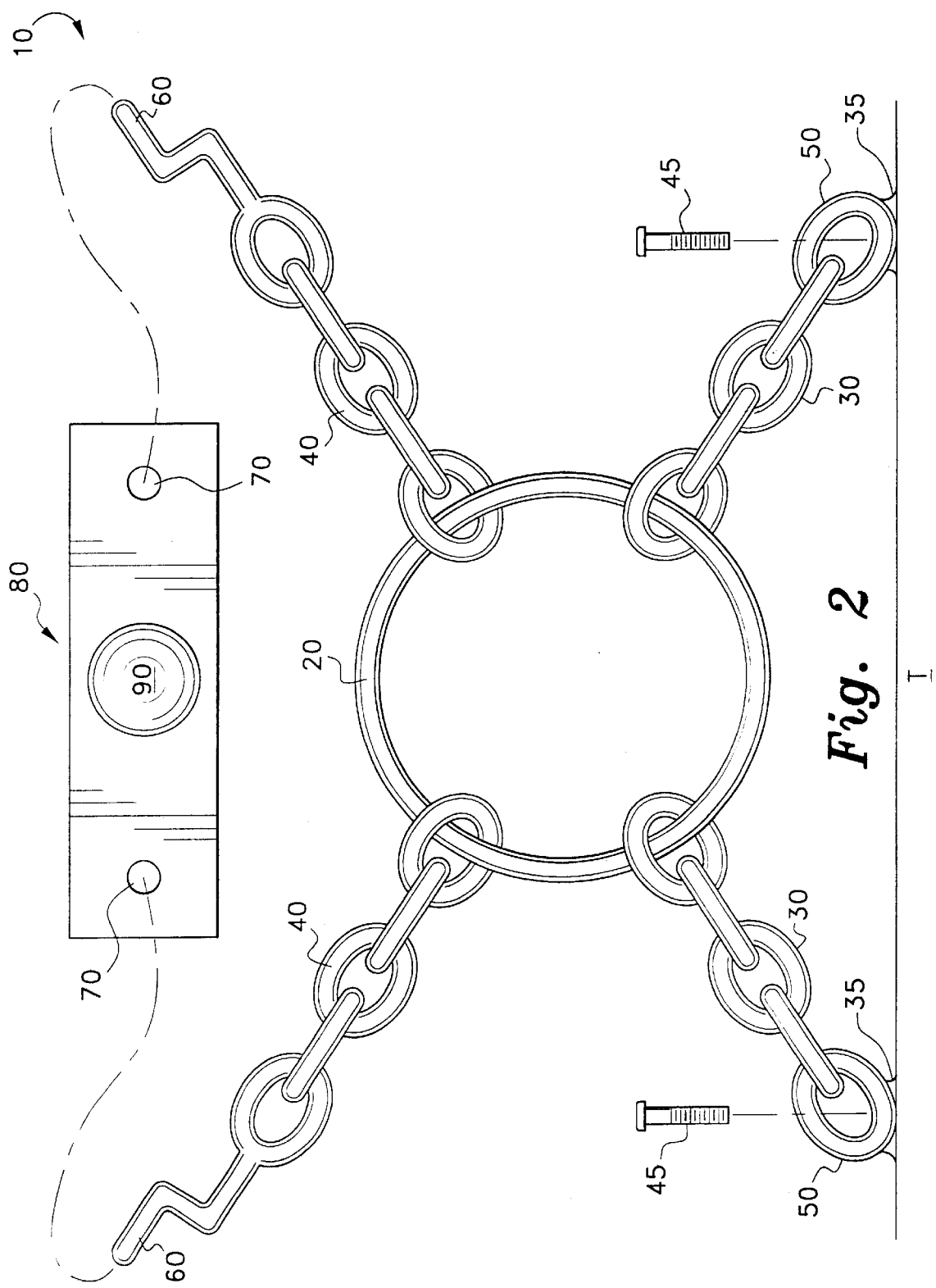
FIG. 2 is an overhead view of a trailer safety chain according to the present invention.

The present invention is a trailer safety chain 10 used in combination with a trailer attachment TA between a vehicle V and a trailer T, as depicted in FIG. 1.

Figure 3:
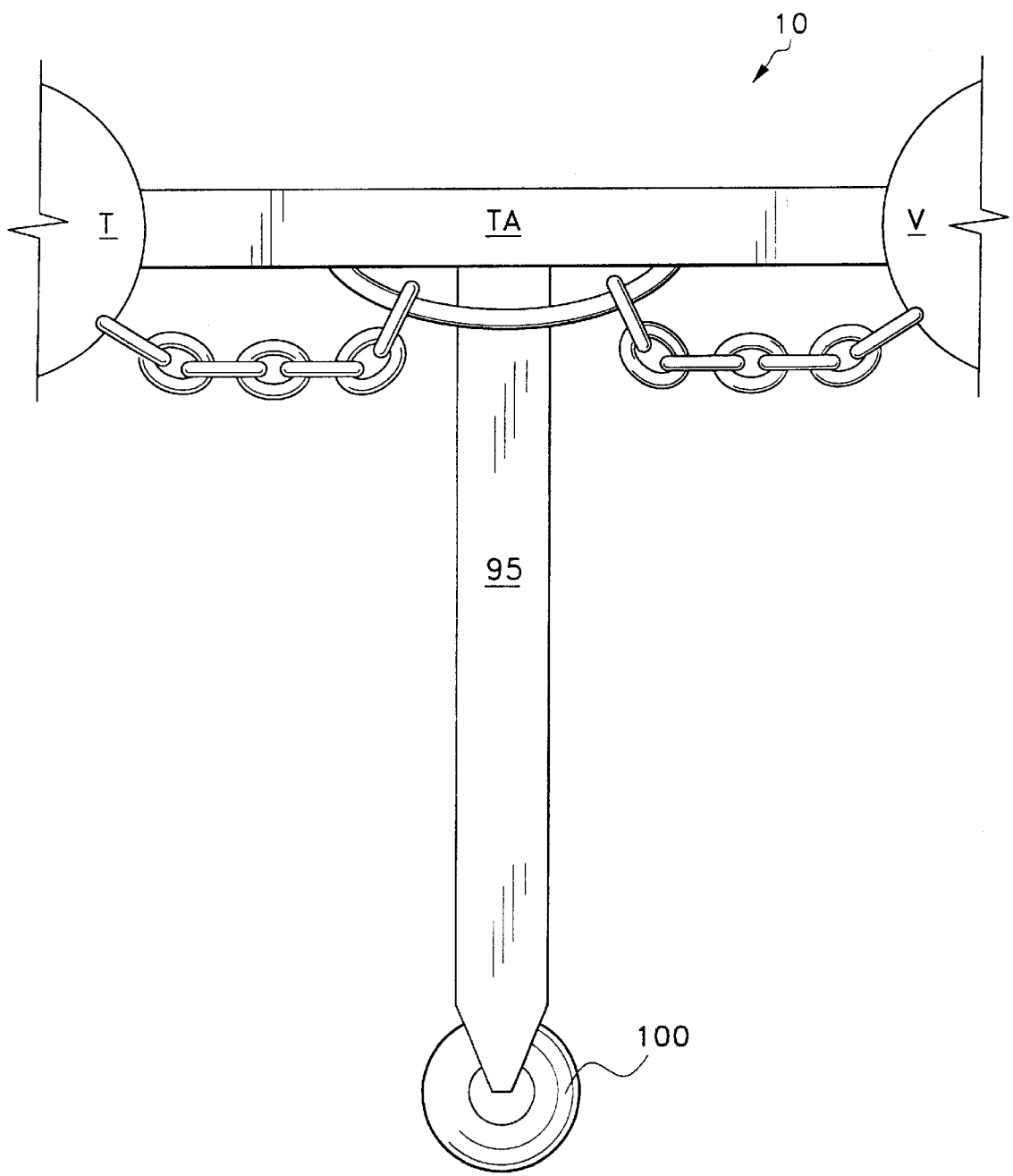
FIG. 3 is a side perspective view of the perpendicular support provided on a trailer safety chain according to the present invention.

The trailer safety chain 10 is comprised of a center ring 20, a plurality of chain strands with a first set of chained strands 30 having one end linked together to the center ring 20 and the other end with a first and second attaching means for attaching the first set of chained 30 strands to the trailer T and the remaining second set of chained strands 40 having one end linked together to the center ring 20 and the other end with a third attaching means for attaching the second set of chained strands 40 to the vehicle V. An additional support post 95 (FIG. 3) is perpendicularly attached to the trailer attachment TA and extends downward just slightly above the ground. A wheel 100 is provided at the end of the support post 95, giving additional support to the trailer safety chain 10 in the event of breakage or malfunction.

A trailer safety chain 10 has a first attaching means for attaching the first set of chained strands 30 to the trailer T. which are welds 35. In other words, the ends of the first set of chained strands 50 are simply welded to the trailer T. The trailer safety chain 10 also has an alternative, second attaching means for attaching the first set of chained strands 30 to the trailer T, which are bolts 45 that hold the ends of the first set of chained strands 50 to the trailer T.

A point of novelty of the trailer safety chain 10 involves the third attaching means for attaching the second set of chained strands 40 to the vehicle V, which are inverted L-shaped hooks 60. These inverted L-shaped hooks 60 have accommodated corresponding apertures 70 which are situated on the mounting plate 80 of the invention. A raised ball trailer hitch 90 is also prominent on the mounting plate 80. The raised ball trailer hitch 90 is the male part of a trailer attachment TA that is inserted into an aperture on the corresponding tongue of the trailer attachment TA (not shown).

There is also a perpendicular support 95 that is provided on the trailer safety chain 10. This perpendicular support 95 provides back-up support in the event that the trailer attachment TA breaks and has a wheel 100 on its bottom end to address any physical contact it might have on the ground.

Operation of the trailer safety chain 10 is uncomplicated. The trailer safety chain 10 is used in combination with a raised ball trailer hitch trailer coupling type of trailer attachment TA and serves as an auxiliary trailer coupling in the event that the primary coupling should break or malfunction. Typically, the first and second set of chained strands 30, 40 are taut between the mounting plate 80 and the trailer T, even when it is not in use. In the event of trailer attachment TA breakage, the tongue of the trailer attachment TA should remain stable from the support of the taut trailer safety chain 10.

Furthermore, the trailer safety chain 10 is designed to prevent the tongue of the trailer attachment TA from touching the ground, due to the structure and support of the trailer safety chain 10 between the trailer T and the vehicle V. Indeed, the trailer safety chain 10 is strong enough to transport the trailer T by itself, even with complete trailer attachment TA breakage. The presence of the perpendicular support 95 provides additional security against the possibility of the trailer attachment TA ever touching the ground.

It is to be understood that the present invention is not limited to the embodiments described above, but encompasses any and all embodiments within the scope of the following claims.

I claim:

1. A trailer safety chain assembly used in combination with a trailer attachment between a vehicle and a trailer, comprising:

a center ring;

a plurality of chain strands with a first set of chained strands having one end linked together to the center ring and the other end with a first and second attaching means for attaching the first set of chained strands to the trailer, and a second set of strands having one end linked together to the center ring and the other end with a third attaching means for attaching the second set of chained strands to the vehicle;

wherein a center safety post is perpendicularly attached to the trailer attachment that also extends through the center ring to the ground.

2. A trailer safety chain assembly according to claim 1, wherein said first attaching means for attaching the first set of chained strands to the trailer are welds.

3. A trailer safety chain assembly according to claim 1, wherein said second attaching means for attaching the first set of chained strands to the trailer are bolts.

4. A trailer safety chain assembly according to claim 1, wherein said third attaching means for attaching the second set of chained strands to the vehicle are inverted L-shaped hooks.

* * * * *